(12) United States Patent  
Powers et al.

(10) Patent No.: US 7,798,316 B2  
(45) Date of Patent: Sep. 21, 2010

(54) ROBOTIC FRAME HANDLING SYSTEM

(75) Inventors: James G. Powers, Warren, MI (US); Allan C. McNear, Farmington Hills, MI (US); Ronald M. Laux, Shelby Township, MI (US); Robert A. Florian, Franklin, MI (US); Paramjit S. Girn, Lake Orion, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 184 days.

(21) Appl. No.: 11/734,016

(22) Filed: Apr. 11, 2007

(65) Prior Publication Data

US 2008/0251351 A1    Oct. 16, 2008

(51) Int. Cl.
*B65G 39/00* (2006.01)
*B65G 43/00* (2006.01)
*B65G 15/00* (2006.01)
*B65G 17/00* (2006.01)

(52) U.S. Cl. .................. 198/842; 198/346.2; 198/346.3; 198/343.2; 198/341.08; 198/341.05; 198/341.02; 198/580; 901/1; 901/2; 901/27; 901/31; 901/46

(58) Field of Classification Search .............. 198/346.2, 198/346.3, 343.2, 341.08, 341.05, 341.02, 198/580

See application file for complete search history.

(56) References Cited

U.S. PATENT DOCUMENTS

| | | | | |
|---|---|---|---|---|
| 4,811,891 A | * | 3/1989 | Yamaoka et al. | 228/182 |
| 4,815,190 A | * | 3/1989 | Haba et al. | 29/430 |
| 5,398,484 A | * | 3/1995 | Kader | 53/481 |
| 5,588,688 A | * | 12/1996 | Jacobsen et al. | 294/106 |
| 6,390,284 B1 | * | 5/2002 | Yamada et al. | 198/687.1 |
| 6,439,371 B1 | * | 8/2002 | Baulier | 198/468.2 |
| 6,662,083 B2 | * | 12/2003 | Angel | 700/248 |
| 7,128,196 B2 | * | 10/2006 | Oldford et al. | 198/345.3 |

* cited by examiner

*Primary Examiner*—Gene Crawford
*Assistant Examiner*—Yolanda Cumbess
(74) *Attorney, Agent, or Firm*—Ralph E. Smith (57) ABSTRACT

A system for handling vehicle frames. The system includes a conveyor assembly including a loading end and an unloading end, and the conveyor assembly carries a plurality of vehicle frames thereon. The system also includes a frame transfer assembly disposed at the unloading end of the conveyor assembly. The frame transfer assembly may be adapted to grasp a vehicle frame from the conveyor assembly and transfer the vehicle frame from the conveyor assembly. A vehicle frame inversion system is also provided that includes a first robotic inversion device that may include a first clamping system, and a second robotic inversion device that may include a second clamping system. The first and second clamping systems are adapted to grasp a vehicle frame, and the first and second robotic inversion devices are adapted to lift and invert the vehicle frame.

17 Claims, 12 Drawing Sheets

ROBOTIC FRAME HANDLING SYSTEM

FIELD

The present disclosure relates to a vehicle frame handling and inversion system.

BACKGROUND

The statements in this section merely provide background information related to the present disclosure and may not constitute prior art.

Vehicle frames are generally supplied to a vehicle manufacturing facility in stacks that include a plurality of the vehicle frames. Since the vehicle frames are delivered in these stacks, the process for un-stacking the frames and conveying the to a manufacturing line is time consuming and labor intensive.

Furthermore, the vehicle frames are conveyed down the manufacturing line in an inverted orientation (i.e., roadside up). The frames are conveyed in a roadside up orientation so that various components that may be attached to the underside of the vehicle frame may be added more easily. Once these components are added to the frame, however, if is necessary to flip the frame so that the frame is roadside down. This process is also labor intensive and time consuming. Accordingly, there is a need for a system that may transfer the frames to the manufacturing line quickly and easily, as well as a need for a system that may invert the frame to a roadside down orientation after various components have been added to the frame quickly and easily.

SUMMARY

The present disclosure provides a system for handling vehicle frames. The system includes a conveyor assembly including a loading end and an unloading end, and the conveyor assembly carries a plurality of vehicle frames thereon. The system also includes a frame transfer assembly disposed at the unloading end of the conveyor assembly. The frame transfer assembly may be adapted to grasp a vehicle frame from the conveyor assembly and transfer the vehicle frame from the conveyor assembly to a carrier system.

The present disclosure also provides a vehicle frame inversion system including a first robotic inversion device that may include a first clamping system, and a second robotic inversion device that may include a second clamping system. The first and second clamping systems are adapted to grasp a vehicle frame, and the first and second robotic inversion devices are adapted to lift and invert the vehicle frame.

The present disclosure also provides a method for transferring vehicle frames including conveying a plurality of the vehicle frames on a conveyor assembly from a loading end to an unloading end, transferring the vehicle frames from the conveyor assembly to a carrier system with a robotic frame handling assembly, and removing a plurality of stacking pins from the vehicle frames with the robotic frame handling system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosures application, or uses. It should be understood that throughout the drawings, corresponding reference numerals indicate like or corresponding parts and features.

Figure 1:
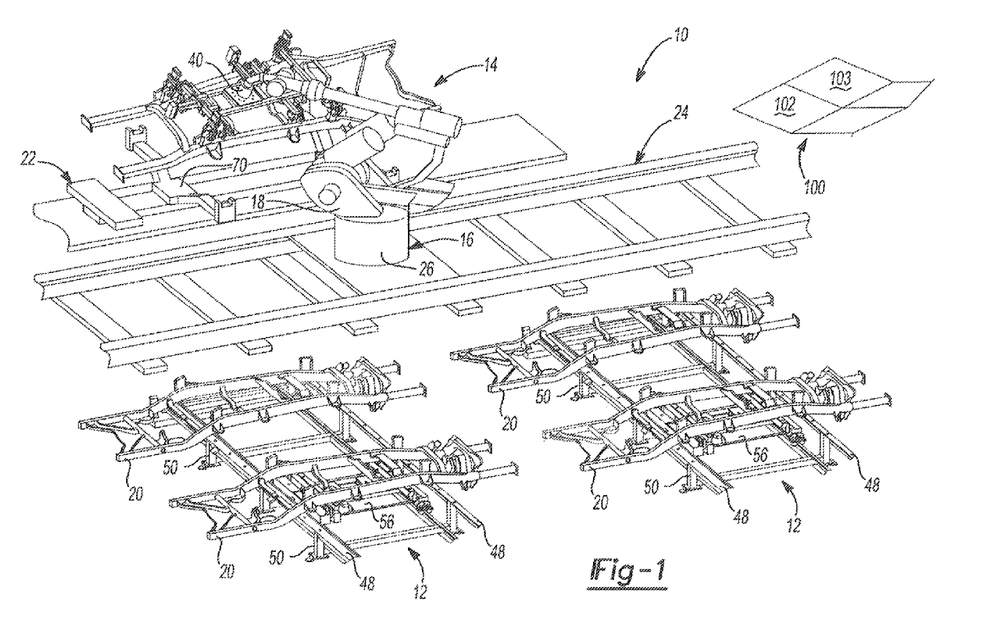
FIG. 1 is a perspective view of a vehicle frame loading system according to the present teachings.
Figure 2:
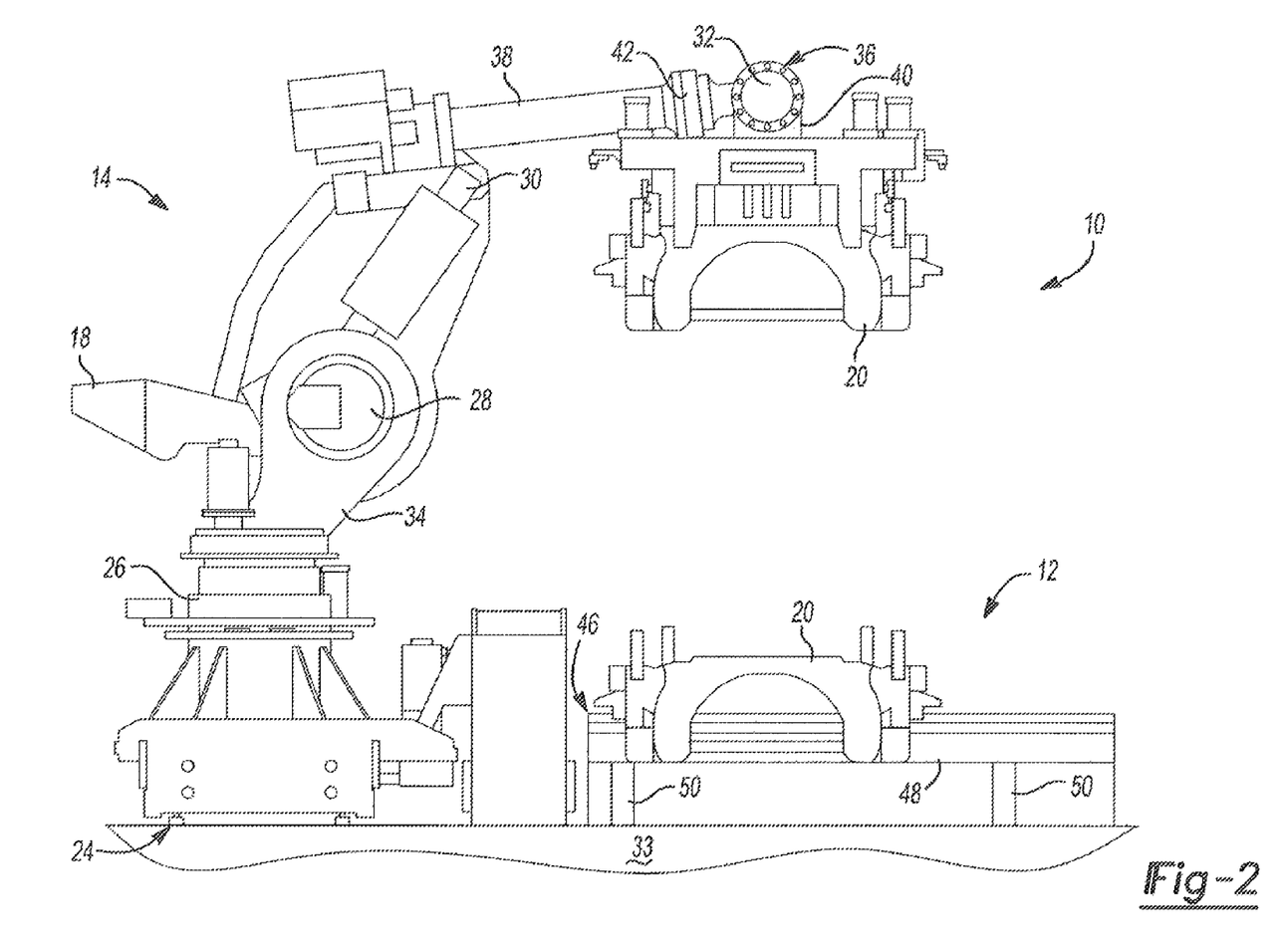
FIG. 2 is a side-perspective view of the vehicle frame loading system according to the present teachings.

FIGS. 1 and 2 illustrate a frame loading system according to the present teachings. The frame load system 10 generally includes a frame conveyor assembly 12 and a frame transfer assembly 14. At least one frame conveyor assembly 12 may be provided, but a pair of frame conveyor assemblies 12 is preferable, however, to increase productivity of the frame load system 10. Frame transfer assembly 14 generally includes a transfer device 16 such as, for example, a robot 18. During operation of the frame loading system 10, vehicle frames 20 travel along frame convey assemblies 12 and are unloaded by robot 18 to a carrier assembly 22. Subsequently, frames 20 travel along a manufacturing line where various components of a vehicle are attached to frame 20.

Robot 18 may be a FANUC robot that is capable of movement along seven axes. The seven axes of movement include linear travel along rail system 24 upon which robot 18 is mounted. Robot 18 is mounted to rail system 24 by a rotatable mount 26. Horizontal rotation about rotatable mount 26 enables robot 18 to rotate back and forth between conveyor assemblies 12 and carrier assembly 22. Robot 18 is also adapted to rotate vertically about first, second, and third pivots 28, 30, and 32, respectively. First, second, and third pivots 28, 30, and 32 enable vertical rotation relative to ground 33. First and second pivots 28 and 30 are provided on main body portion 34 of robot 18, while third pivot 32 is provided at an end 36 of an arm 38 of robot 18. Robot 18 is also capable of rotating frame 20 360° relative to main body portion 34 with a first rotatable coupling 40. Lastly, robot 18 is capable of balancing frame 20 relative to either conveyor assembly 12 or carrier assembly 22 with a second rotatable coupling 42. Due to the seven axes of movement, robot 18 is capable of retrieving vehicle frame 20 from conveyor assembly 12 and transferring frame 20 to carrier assembly 22 in a time-efficient manner.

Figure 3:
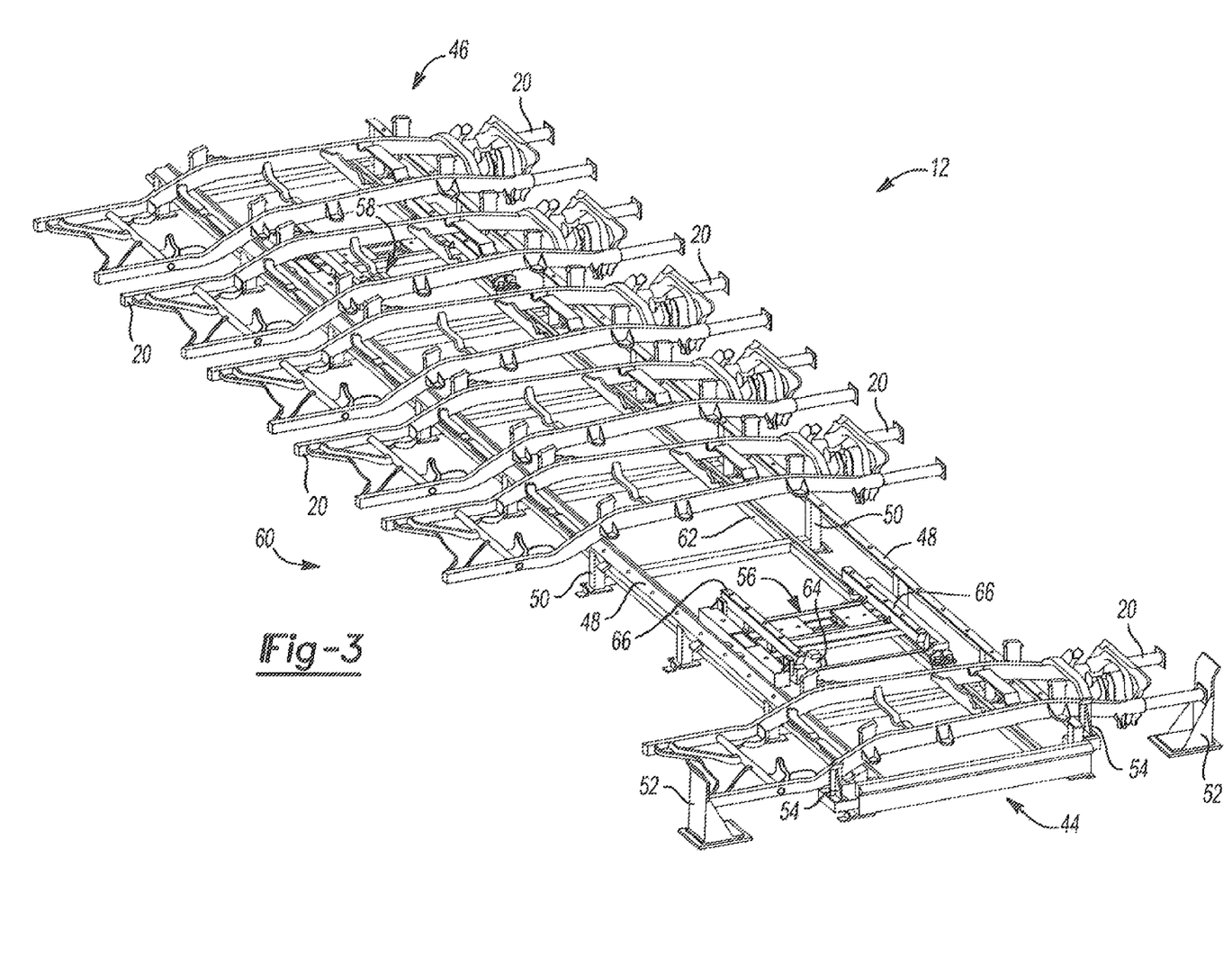
FIG. 3 is a perspective view of a frame conveyor assembly according to the present teachings.
Figure 4:
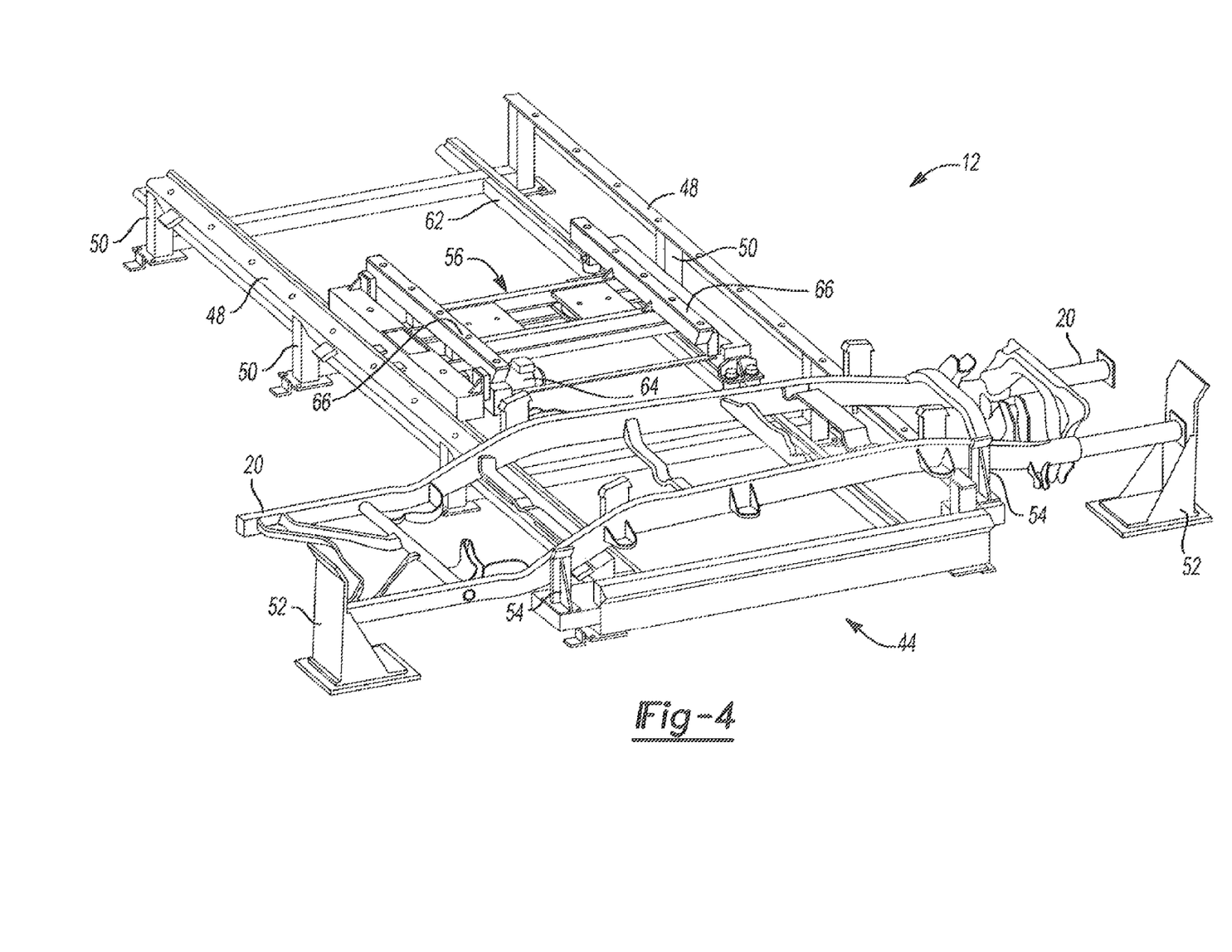
FIG. 4 is another perspective view of the frame conveyor assembly according to the present teachings.
Figure 5:
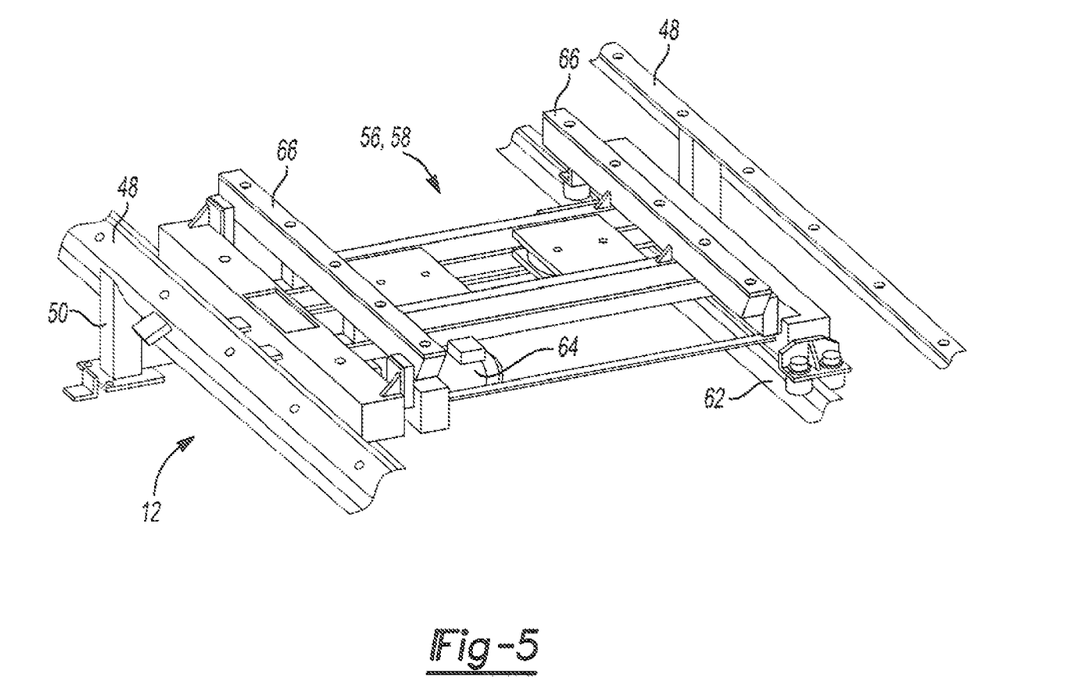
FIG. 5 is a perspective view of a conveyor device of the frame conveyor assembly.

FIGS. 3, 4, and 5 illustrate frame conveyor assemblies 12. Frame conveyor assemblies 12 generally include first or frame load end 44 where frames 20 are loaded onto conveyor assembly 12, and a second or frame unloading end 46 where robot 18 is disposed to unload frames 20 from conveyor assembly 12 and transfer frames 20 to carrier assembly 22. Frame conveyor assemblies 12 include a pair of rails 48 supported by a plurality of buttresses 50 that are securely fastened to ground 33.

A forklift or some other type of mechanical device is used to lift frames 20 from a pallet or other storage receptacle (not shown) and place them on rails 48 at frame load end 44 of conveyor assembly 12. To ensure that frames 20 are properly placed on rails 48, frame load end 44 includes a pair of guide members 52. Guide member 52 may spaced at any predetermined distance to accommodate a length of frame 20 and, therefore, may be adjusted to accommodate various frames 20 for various vehicle platforms. Frame load end 4 also includes a pair of stops 54 that prevent frames 20 from falling off frame load end 44.

Each conveyor assembly 12 also includes at least one conveyor device 56. A second conveyor device 58 may be used, however. First conveyor device 56 may be disposed and movable between frame load end 44 and a middle portion 60 of conveyor assembly 12. Second conveyor device 56 may be disposed and movable between middle portion 60 and frame unload end 46. First and second conveyor devices 56 and 58 are movably mounted to sub-rails 62, and are actuatable by motor 64. In addition to moving conveyor devices 56 and 58 along sub-rails 62, motor 64 may lift a platform 66. Platform 66 may be used to lift frame 20 from rails 48. Once frame 20 has been lifted by platform 66, frame 20 may be moved from frame load end 44 to frame unload end 46 of conveyor assembly 12.

More particularly, once frame 20 is placed on rails 48 of conveyor assembly 12, first conveyor device 56 travels along sub-rails 62 to a position beneath frame 20 at frame load end 44. Platform 66 is then lifted by motor 64, which then lifts frame 20 off of rails 48. Platform 66 lifts frame 20 off of rails 48 by a distance that may range between about 5 inches and about 3 feet, and first conveyor device 56 carries frame 20 to middle portion 60. Once frame 20 has reached middle portion 60, platform 66 may be lowered, frame 20 may be placed back on rails 48, and first conveyor device 56 may return to loading end 44 to retrieve another frame 20.

Second conveyor 58 then travels along sub-rails 62 to a position beneath frame 20. Platform 66 of second conveyor 58 is then lifted by motor 64 to lift frame 20 off rails 48. Second conveyor 58 then carries frame 20 from middle portion 60 to frame unload end 46. Once frame 20 has reached frame unload end 46, platform 66 may be lowered, frame 20 may be placed back on rails 48, and second conveyor device 58 may return to middle portion 60 to retrieve another frame 20. By using a pair of conveyor devices 56 and 58 in tandem, a plurality of frames 20 may be moved along conveyor assembly 12 automatically, and increases in productivity may be achieved Once frame 20 has reached frame unload end 46, robot 18 moves into a position over frame 20. Robot 18 is then actuated to a position over frame 20. Robot 18 then rotates downward to frame 20 and secures thereto. To secure frame 20 to robot 18, robot 18 is provided with a clamping assembly 68 at end 36 of arm 38. Once clamping assembly 68 has attached to frame 20, robot 18 may lift frame 20 from conveyor assembly 12. Robot 18 and frame 20 then rotate about base 26, and robot 18 travels down rail system 24. Once robot 18 reaches a position adjacent carrier assembly 22, robot 18 places frame 20 onto a carrier 70. Frame 20 is then transferred through the manufacturing facility to have various vehicle components attached thereto.

Figure 6:
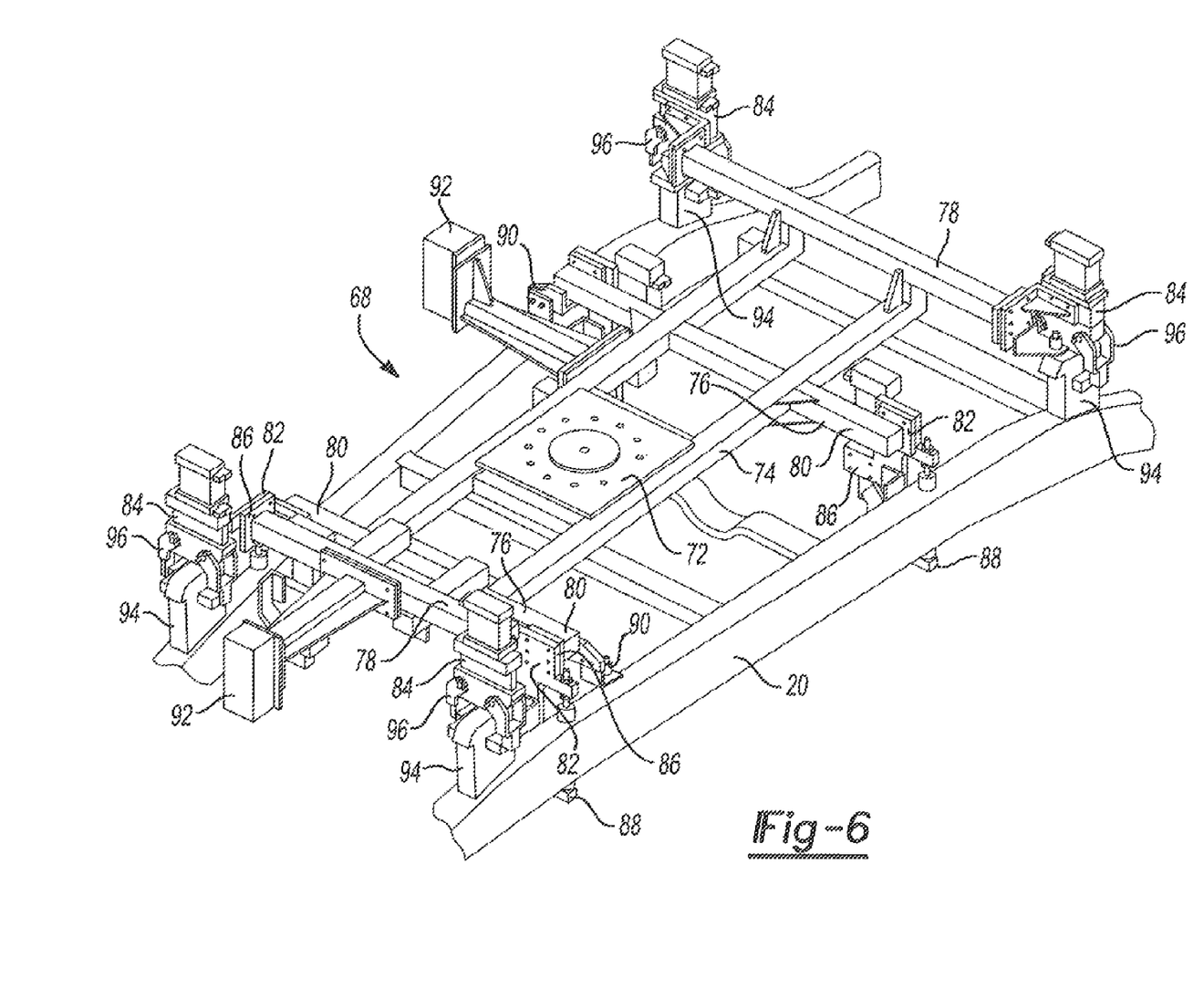
FIG. 6 is a perspective view of a clamping assembly of a frame load assembly according to the present teachings.
Figure 7:
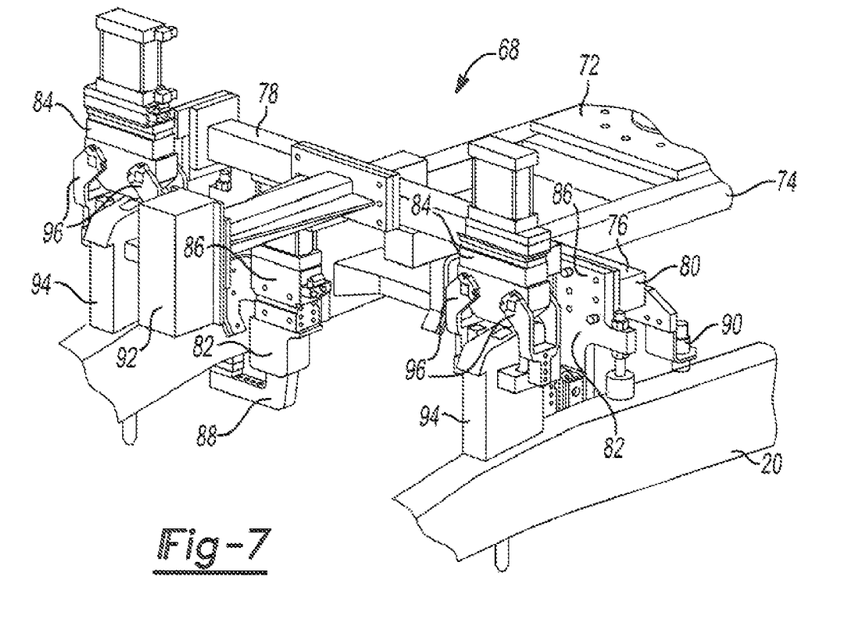
FIG. 7 is a perspective view of the clamping assembly of the frame load assembly.
Figure 8:
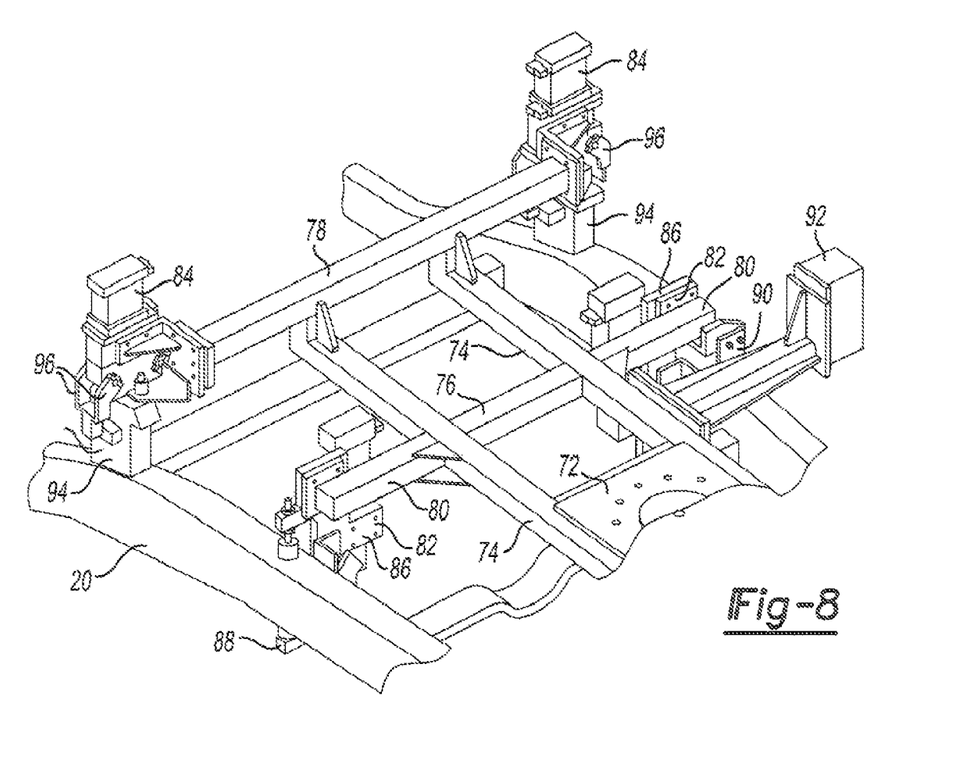
FIG. 8 is a perspective view of the clamping assembly of the frame load assembly.

As shown in FIGS. 6, 7, and 8, clamping assembly 68 is provided with a coupling 72 that attaches to rotatable coupling 40 of robot 18. Coupling 72 enables clamping assembly 68 and frame 20 to rotate relative to robot arm 38. Coupling 72 may be attached to a frame 74 that may include inner support arms 76 and outer support arms 78. At ends 80 of inner support arms 76 may be disposed clamps 82 that may be used to secure frame 20 to clamping assembly 68. Outer support arms 78 may include stacking pin removal devices 84.

Clamps 82 secure frame 20 to clamping assembly 68 and enable robot 18 to lift and move frame 20 from conveyor assembly 12. Clamps 82 may include a clamp body 86 having a clamp arm 88 rotatably coupled thereto. Clamps 82 may also include a sensor device 90 that ensures that clamping assembly 68 is properly aligned with frame 20.

Sensor devices 90 may be a proximity sensor or some other type of alignment device that ensures that clamping assembly 68 is properly aligned with frame 20. As an alternative to sensor devices 90, clamping assembly 68 may be provided with cameras 92 to ensure that clamping assembly 68 is properly aligned with frame 20. Although it is preferable to use either sensor devices 90 or cameras 92 to ensure proper alignment, it should be understood that clamping assembly 68 may be provided with both systems simultaneously.

After robot 18 has moved into position over frame 20 and proper alignment of clamping assembly 68 relative to frame 20 is ensured by sensors 90 or cameras 92, clamp arms 88 may rotated to clamp frame 20. When clamp arms 88 are secured to frame 20, frame 20 may be lifted from conveyor assembly 12 and placed onto carrier system 22. Subsequently, clamp arms 88 may be disengaged from frame 20, and clamping assembly 68 may be moved away from frame 20.

As clamping assembly 68 is moved away from frame 20 by robot 18, stacking pin removal devices 84 may be used to remove stacking pins 94 from frame 20. Stacking pins 94 are used to stack a plurality of frames 20. More particularly, frames 20 may be delivered to the manufacturing facility in stacks. Stacking pins 94 are generally placed at the four corners of the frame 20, and ensure that frames 20 remain reliably connected to each other during transportation of frames 20 to the manufacturing facility. Since stacking pins 94 do not form part of the finished vehicle, stacking pins 94 need to be removed prior to various additional components being added to frame 20. Removal devices 84 clamp onto and remove stacking pins 94 from frame 20.

More particularly, after clamps 82 have engaged and clamped onto frame 20, removal devices 84 are actuated to clamp onto stacking pins 94. Removal devices 84 include air-powered finger clamps 96 that are rotatably coupled to a pin removal device main body 98. Finger clamps 96 are actuated to grasp stacking pins 94. After clamps 82 have disengaged from frame 20, finger clamps 96 remain clamped to stacking pins 94. As robot 18 lifts clamping assembly 68 from frame 20, finger clamps 96 remove stacking pins 94 from frame 20. By automating removal of stacking pins 94, productivity is increased.

After stacking pins 94 are removed from frame 20, robot 18 travels down track system 24 toward a stacking pin recycling system 100. Recycling system 100 generally includes a pair of chutes 102 and 103 that communicate with a receptacle (not shown). Once robot 18 has reached recycling system 100, finger clamps 96 disengage from stacking pins 94 and stacking pins 94 are dropped into chute 102. Stacking pins 94 may then travel down chute systems 102 and 103 to the receptacle. In this manner, stacking pins 94 may be recycled to reduce manufacturing costs. Stacking pins 94 are different for the front and rear portions of frame 20. Stacking pins 94, therefore, may be sorted accordingly. For example, stacking pins from the from of frame 20 may be sent down chute 103, white stacking pins 94 from the rear of the frame 20 may be sent down chute 102. After disposing of stacking pins 94, robot 18 travels along track system 24 back to conveyor assemblies 12. The above processes are then repeated.

After frame 20 has been transferred to carrier system 22, frame 20 travels along a production line that adds various components to frame 20. As stated above, during this process frame 20 is upside down. That is, frame 20 is roadside up. After the components have been added to frame 20, it is necessary to invert frame 20 to a roadside down position. To invert frame 20 to the roadside down position, a frame inversion system 104 is used.

Figure 9:
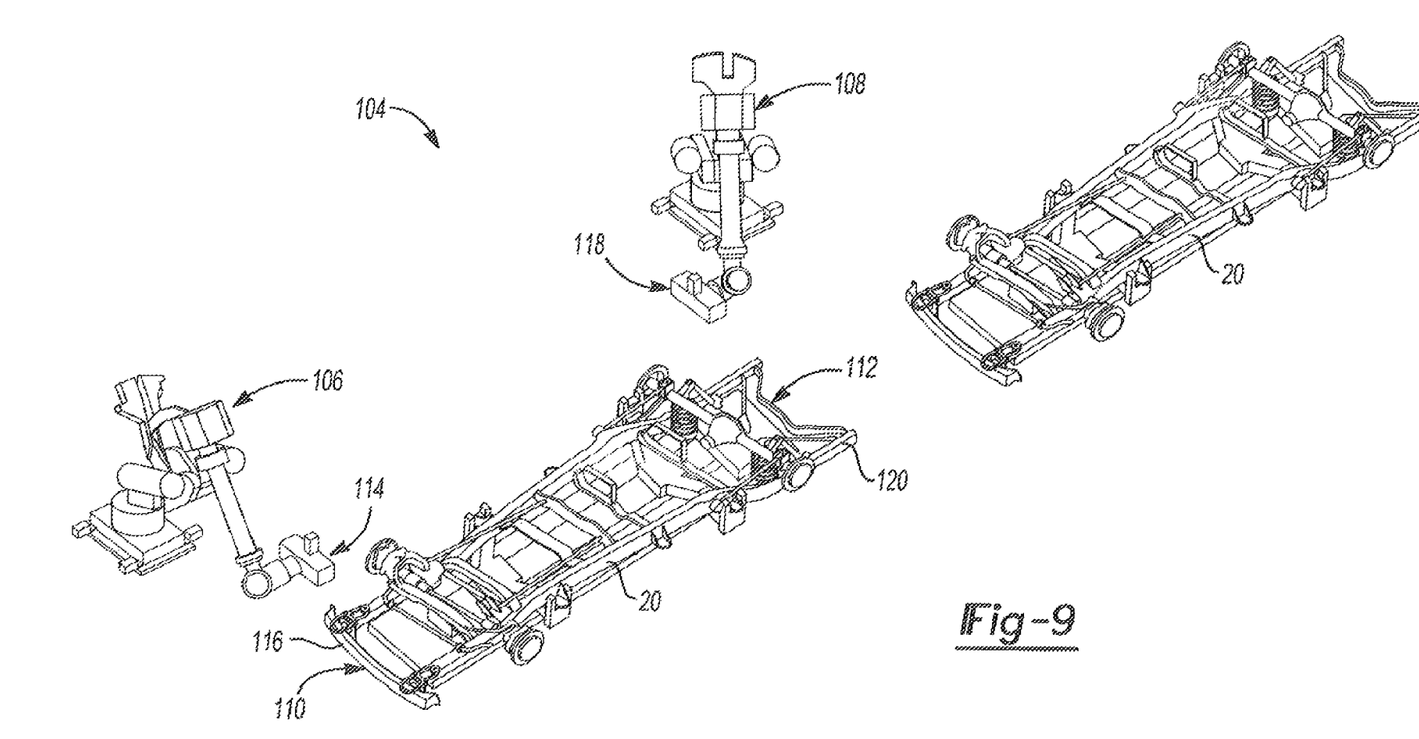
FIG. 9 is a perspective view of a frame inversion system according to the present teachings.
Figure 10:
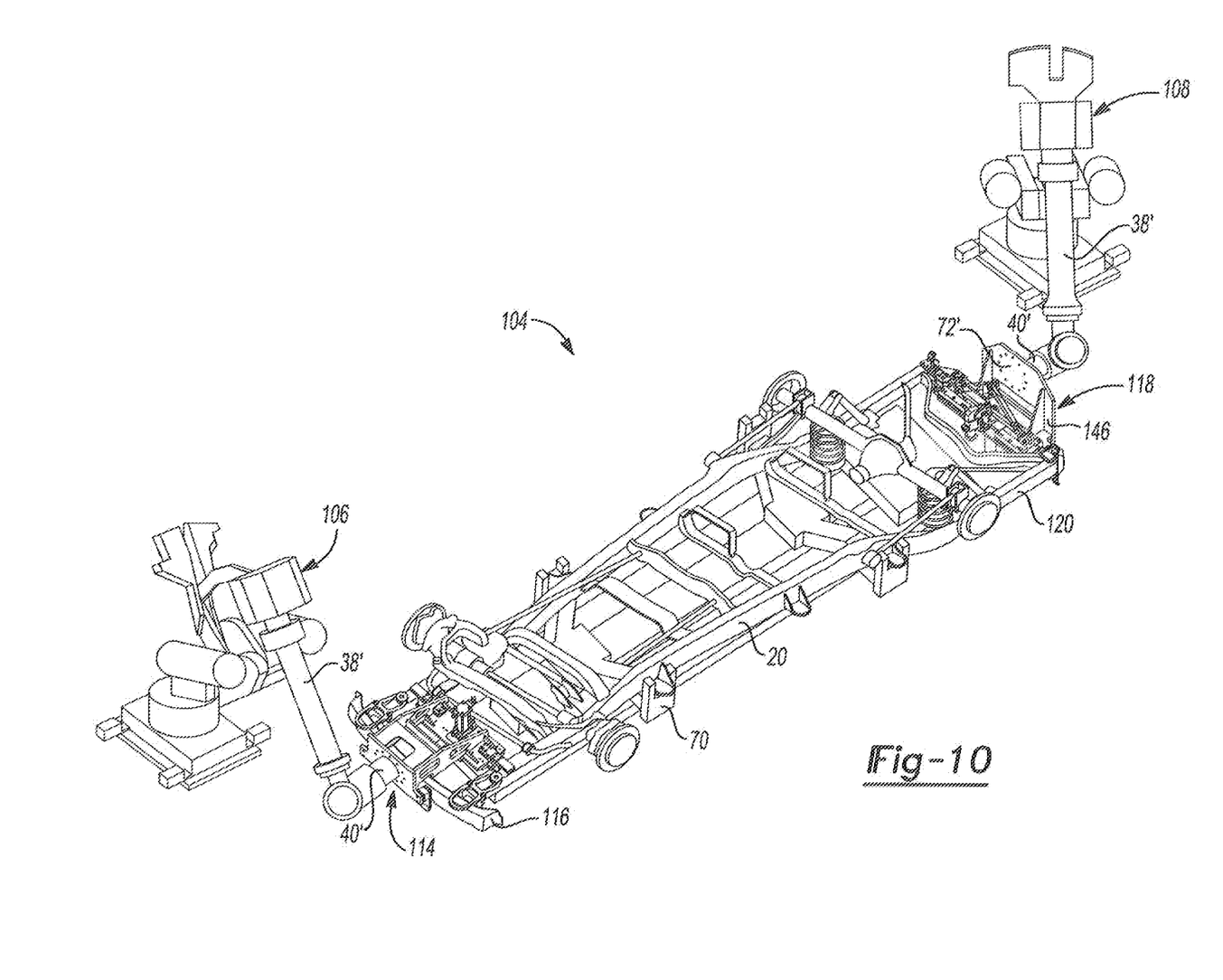
FIG. 10 is another perspective view of the frame inversion system according to the present teachings.
Figure 11:
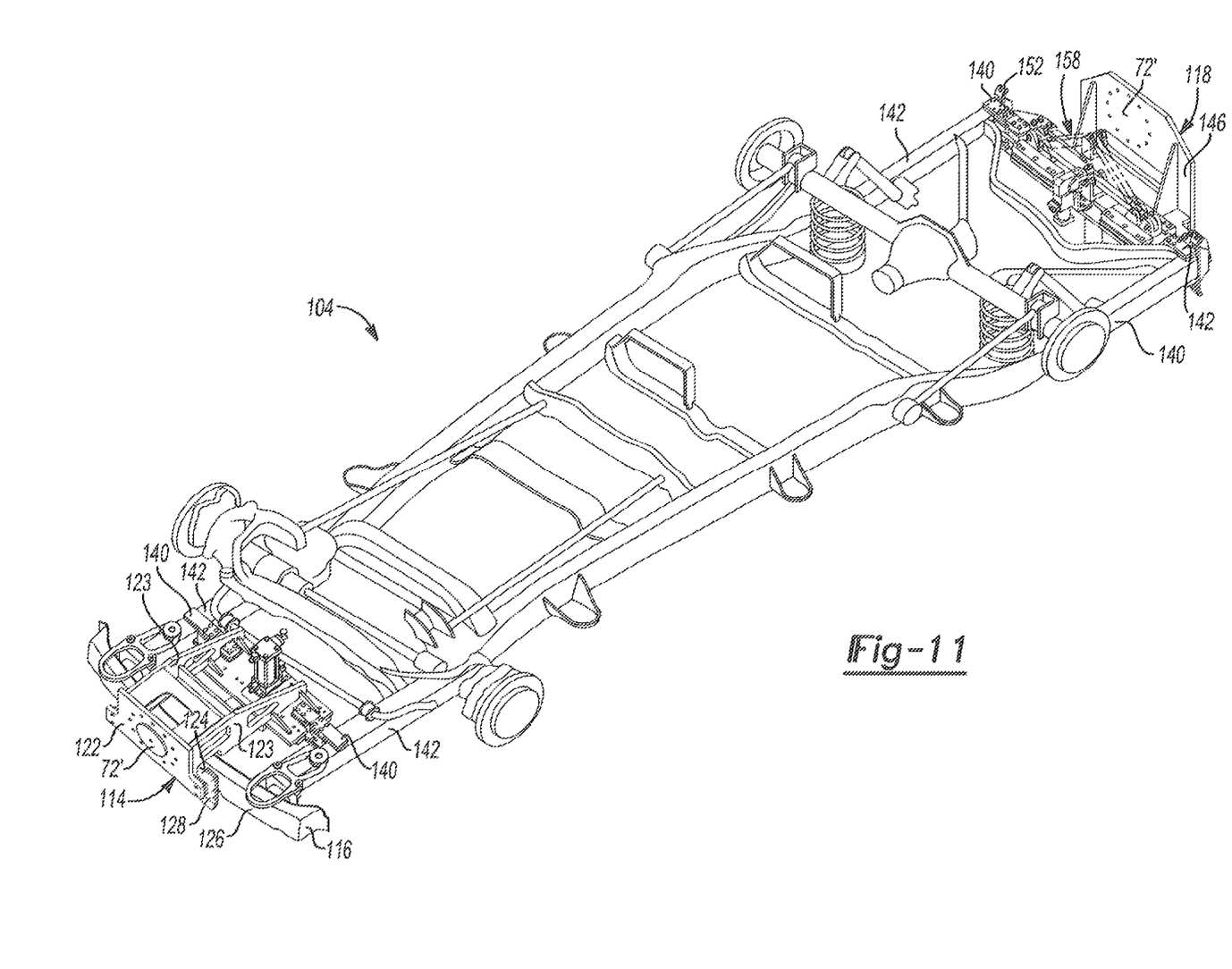
FIG. 11 is a perspective view illustrating clamping systems of the frame inversion system.

Referring to FIGS. 9 and 10, frame inversion system 104 includes a first or frontal inversion device 106 and a second or rear inversion device 108. Inversion devices 106 and 108 may be FANUC robots similar to robot 18, and have seven axes of movement. Accordingly, description of the parts of inversion devices 106 and 108 that are common to both inversion devices 106 and 108 is omitted for clarify. Since inversion devices 106 and 108 may have seven axes of movement, inversion devices 106 and 108 may be actuated and rotated to invert frame 20 from a roadside up to a roadside down position. Once frame 20 has moved into, position between inversion devices 106 and 108, each inversion device 106 and 108 moves into position at a front 110 and rear 112 of frame 20.

As best shown in FIGS. 11-15, frontal inversion device 106 may be provided with a first clamping system 114 that enables the frontal inversion device 106 to reliably grasp a frontal region 116 of frame 20, and rear inversion device 108 may be provided with a second clamping system 118 that enables rear inversion device 108 to reliably grasp a rear region 120 of frame 20. Clamping systems 114 and 118 may each be provided with a coupling 72' that attaches to rotatable coupling 40' of inversion devices 106 and 108. Coupling 72' enables clamping systems 114 and 118 and frame 20 to rotate relative to arms 38' of inversion devices 106 and 108.

Figure 12:
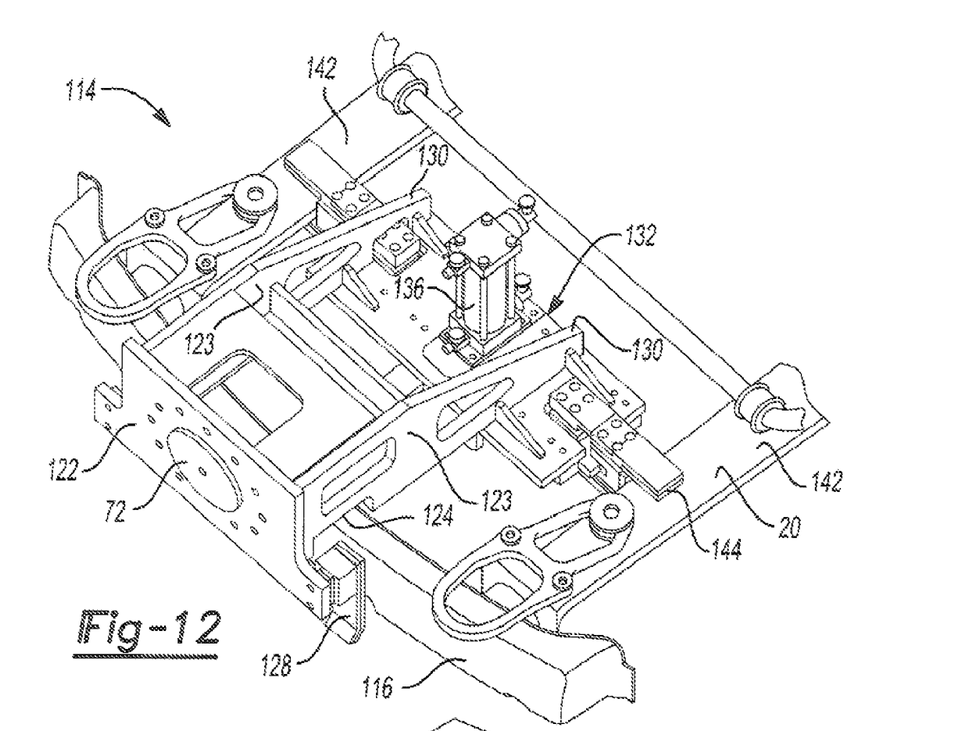
FIG. 12 is a perspective view of a frontal clamping system of the frame inversion system.
Figure 13:
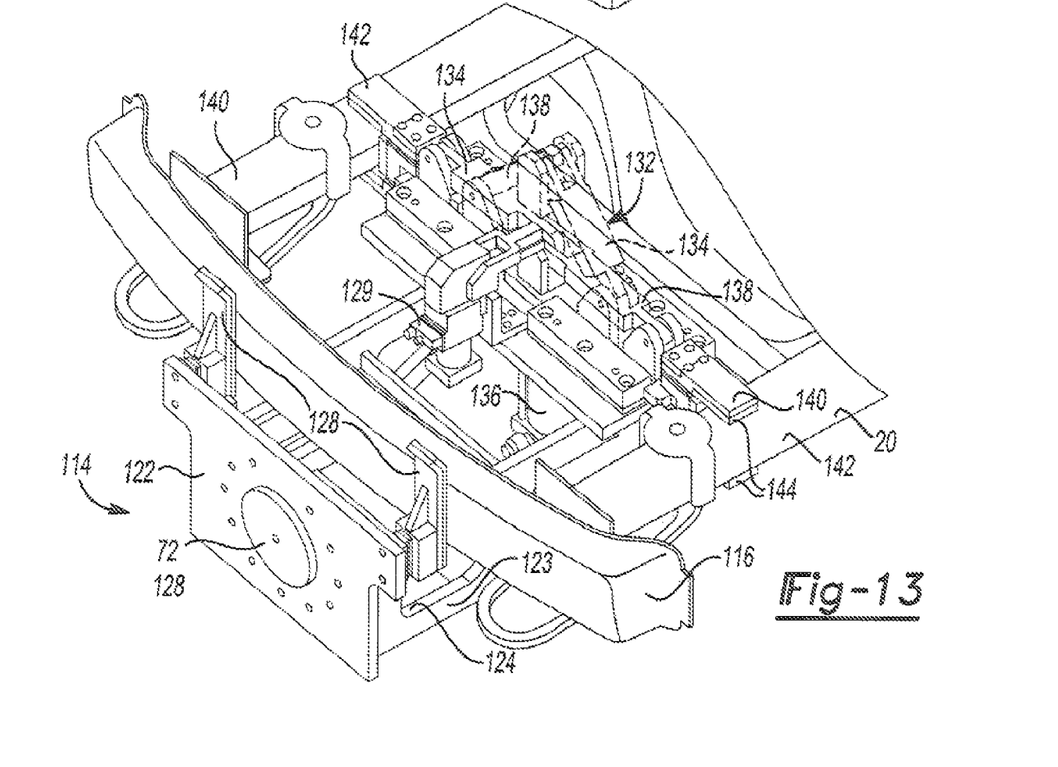
FIG. 13 is a perspective view of the frontal clamping system of the frame inversion system after the frame has been inverted.

With particular reference to FIGS. 12 and 13, coupling 72' of first clamping system 123 may be attached to a frame 122. Frame 122 may include support panels 116 that may include recesses 124 that are designed to accommodate a cross-bar 126 of frame 20. Frame 122 may also include stops 128. Recesses 124 and stops 128 assist in ensuring that first clamping system 114 is properly aligned with frontal region 116 of frame 20. To reliably ensure that frame 20 is properly aligned, a sensor device 129 is provided. Sensor device 129 may be similar to sensor 90 and, therefore, description and operation thereof is omitted. Between distal ends 130 of support panels 123 opposite frame 122 may be disposed a first scissor clamping mechanism 132.

Scissor clamping mechanism 132 may include a pair of actuation arms 134 that are driven by a drive mechanism 136. Drive mechanism 136 may be a hydraulic cylinder or an air cylinder. Actuation arms 134 are connected to clevises 138, which are connected to clamps 140. Once first clamping system 114 is in position relative to frame 20, drive mechanism 136 is fired to drive actuation arms 134 outward toward support beams 142 of frame 20. As actuation arms 134 are driven outward, clevises 138 and clamps 140 are actuated outward as well to a position that secures support beams 142 of frame therebetween. Clamps 140 have pads 144 that are separated at a distance substantially equal to a thickness of support beam 142. Once frame 20 is disposed between clamps 140, drive mechanism 136 remains in a fired state to ensure that frame 20 remains secured by first clamping system 114.

Figure 14:
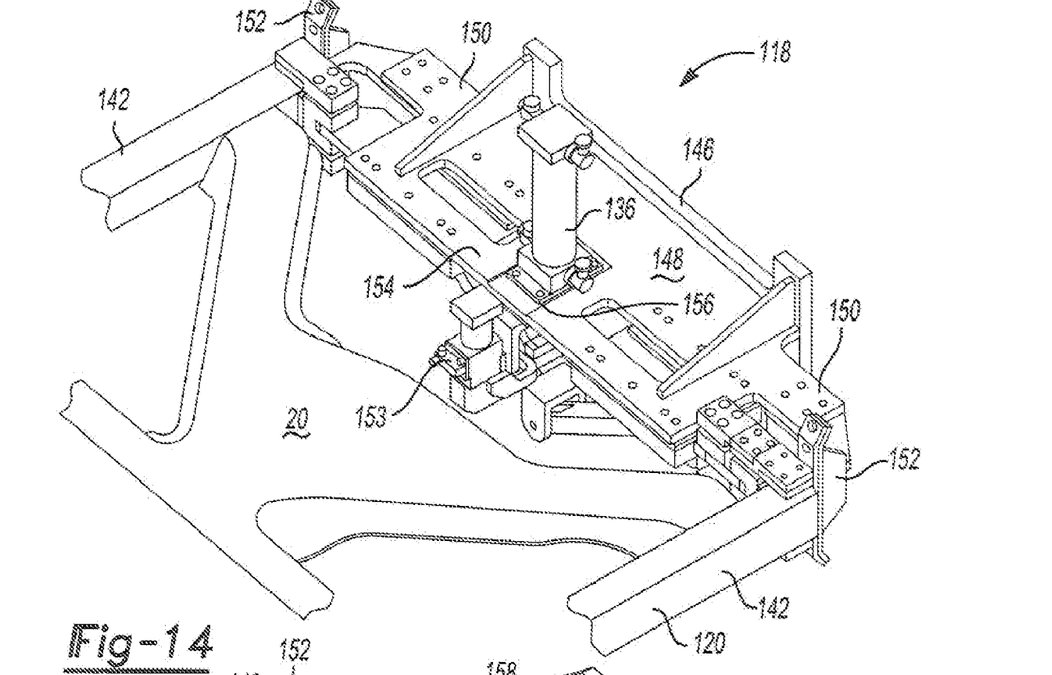
FIG. 14 is a perspective view of a rear clamping system of the frame inversion system.
Figure 15:
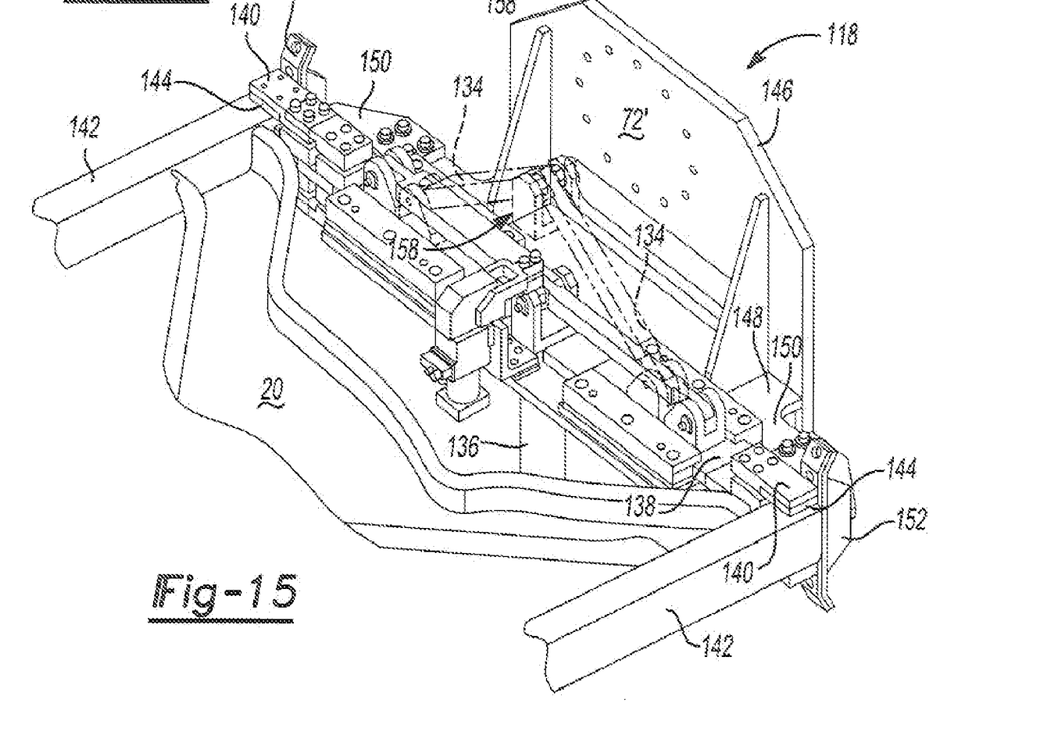
FIG. 15 is a perspective view of the rear clamping system of the frame inversion system after the frame has been inverted.

With particular reference to FIGS. 14 and 15, coupling 72' of second clamping system 118 may be attached to a frame 146. Frame 146 may include a base panel 148 that may have a width about equal to a width of rear region 120 of frame 20. Attached at ends 150 of base panel 148 may be stops 152. Stops 152 assist in ensuring that second clamping system 118 is properly aligned with rear region 120 of frame 20. Another sensor device 153 may be used to reliably align frame 20 with second clamping system 118. Sensor device 153 is similar to sensor 129 and, therefore, description and operation thereof is omitted. Approximate a middle portion 154 of base panel 148 may be a recess 156 that accommodates a drive mechanism 136 that drives a second scissor clamping mechanism 158. Additional components of second scissor clamping mechanism 158 are supported by base panel 148.

Second scissor clamping mechanism 158 may also include a pair of actuation arms 134 that are driven by drive mechanism 136. Similar to scissor clamping mechanism 132, drive mechanism 136 may be a hydraulic cylinder or an air cylinder. Actuation arms 134 are connected to clevises 138, which are connected to clamps 140. Once second clamping system 118 is in position relative to frame 20, drive mechanism 136 is fired to drive actuation arms 134 outward toward support beams 142 of frame 20. As actuation arms 134 are driven outward, clevises 138 and clamps 140 are actuated outward as well to a position that secures support beams 142 of frame 20 therebetween. Clamps 140 have pads 144 that are separated at a distance substantially equal to a thickness of support beam 142. Once frame 20 is disposed between clamps 140, drive mechanism 136 remains in a fired state to ensure that frame 20 remains secured by first clamping system 118.

Because of the different constructions of the frontal and rear regions 116 and 120 of frame 20, first and second clamping systems 114 and 118 may approach frame 20 in different manners. To accommodate the different constructions of frontal and rear regions 116 and 120, first inversion device 106 approaches frontal region 116 of frame 20 from above and second inversion device 108 approaches rear region 120 of frame 20 from below. Regardless, after frame 20 is secured between first and second clamping systems 114 and 118, inversion devices 106 and 108 lift and rotate frame 20 from roadside up to roadside down. After inversion of frame 20, inversion devices 106 and 108 replace frame 20 on carrier system 22. First and second clamping systems 114 and 118 subsequently release frame 20 and inversion devices 106 and 108 move away from frame 20. Frame 20 is then free to continue down the assembly line to complete fabrication of the vehicle. Automation of the inversion process increases productivity and reduces costs relative to a manual process of inverting frame 20.

The description of the present teachings is merely exemplary in nature and, thus, variations that do not depart from the gist of the present teachings are intended to be within the scope of the present. Such variations are not to be regarded as a departure from the spirit and scope of the present teachings.

What is claimed is:

1. A system for handling vehicle frames, comprising:
a conveyor assembly for carrying a plurality of the vehicle frames thereon, said conveyor assembly including a loading end and an unloading end, a pair of rails that support the vehicle frames, and a pair of sub-rails disposed beneath and in parallel with said pair of rails that support a conveyor device movably disposed thereon, said conveyor device operable to move the vehicle frames along said rails from said loading end to said unloading end of said conveyor assembly;
a frame transfer assembly disposed at said unloading end of said conveyor assembly, said frame transfer assembly adapted to grasp a vehicle frame from said conveyor assembly and transfer the vehicle frame from said conveyor assembly, said frame transfer assembly includes a plurality of stacking pin removal devices for removal of stacking pins from the vehicle frame; and
a chute system adjacent said frame transfer assembly, said chute system adapted to recycle said stacking pins removed from the vehicle frame.

2. The system of claim 1, wherein said frame transfer assembly is a robot.

3. The system of claim 1, wherein said frame handling system includes a clamping assembly for grasping the vehicle frame.

4. The system of claim 3, wherein said clamping assembly includes a proximity sensor that detects a proximity of the vehicle frame to said clamping assembly.

5. The system of claim 3, wherein said clamping assembly includes a camera for detecting a proximity of the vehicle frame to said clamping assembly.

6. The system of claim 1, wherein a pair of conveyor devices are movably disposed on said sub rails, a first conveyor device of said pair adapted to move the vehicle frames from said loading end to a middle portion of said conveyor assembly, and a second conveyor device of said pair adapted to move the vehicle frames from said middle portion to said unloading end of said conveyor assembly.

7. The system of claim 1, wherein said frame handling system transfers the vehicle frames to a carrier system.

8. The system of claim 1, wherein said conveyor device movably disposed on said sub rails includes a platform actuatable between an undeployed position and a deployed position, said conveyor device operable to move beneath one of the vehicle frames, raise said platform to said deployed position to hoist the vehicle frame from said rails, move along said sub rails while hoisting the vehicle frame, and lower said platform to said undeployed position to move the vehicle frame from said loading end to said unloading end.

9. A vehicle frame inversion system comprising:
a first robotic inversion device including a first clamping system and a second robotic inversion device including a second clamping system, each of said first and second clamping systems including couplings rotatably connected to said first and second robotic inversion devices, each of said first and second clamping systems including actuation arms having clamps at ends thereof that, when said first and second clamping systems are disposed proximate a respective opposing end of a vehicle frame, are actuated outward relative a position normal said vehicle frame such that said clamps securely grasp said vehicle frame to enable said first and second robotic inversion devices to lift and invert said vehicle frame in tandem, and after inverting said vehicle frame, said actuation arms are actuated inward to release said clamps from said vehicle frame.

10. The inversion system of claim 9, wherein said first and second clamping systems are scissor clamping mechanisms.

11. The inversion system of claim 9, wherein said scissor clamping mechanisms are driven by a hydraulic or air cylinder drive mechanism.

12. The inversion system of claim 9, wherein said first and second clamping systems includes a proximity sensor that detects a proximity of the vehicle frame to said clamping systems.

13. A method for transferring vehicle frames, comprising:
conveying a plurality of the vehicle frames on a conveyor assembly from a loading end to an unloading end;
transferring the vehicle frames from said conveyor assembly to a carrier system with a robotic frame handling assembly;
removing a plurality of stacking pins from the vehicle frames and recycling said stacking pins by disposing said stacking pin in a chute system with said robotic frame handling system.

14. The method of claim 13, wherein said conveyor assembly includes rails that support the vehicle frames and sub-rails that movably support a plurality of conveyor devices, said conveyor devices conveying the vehicle frames from said loading end to said unloading end of said conveyor assembly.

15. The method of claim 13, wherein said robotic frame handling system includes a clamping assembly for grasping the vehicle frame and grasping said plurality of stacking pins.

16. The method of claim 13, further comprising inverting the vehicle frame with a frame inversion system after transferring the vehicle frame to said carrier system, said frame inversion system including a pair of robotic inversion devices.

17. The method of claim 13, wherein said conveyor assembly includes a pair of rails that support the vehicle frames, and a pair of sub-rails disposed beneath and in parallel with said pair of rails that support a conveyor device movably disposed thereon, said conveyor device including a platform actuatable between an undeployed position and a deployed position such that said conveyor device is operable to move beneath one of the vehicle frames, raise said platform to said deployed position to hoist the vehicle frame from said rails, move along said sub rails while hoisting the vehicle frame, and lower said platform to said undeployed position to move the vehicle frame from said loading end to said unloading end.

* * * * *